US006211486B1

(12) United States Patent
Ishimatsu et al.

(10) Patent No.: US 6,211,486 B1
(45) Date of Patent: Apr. 3, 2001

(54) METHOD OF MAKING INK JET RECORDING HEAD WITH TAPERED ORIFICE

(75) Inventors: Shin Ishimatsu; Masanori Takenouchi; Ken Hosaka, all of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/109,174

(22) Filed: Jul. 2, 1998

(30) Foreign Application Priority Data

Jul. 4, 1997 (JP) .......... 9-179760
Jun. 26, 1998 (JP) .......... 10-180943

(51) Int. Cl.[7] .......... B23K 26/00
(52) U.S. Cl. .......... 219/121.71; 219/121.73
(58) Field of Search .......... 219/121.71, 121.73, 219/121.85, 121.69; 29/890.1; 264/400

(56) References Cited

U.S. PATENT DOCUMENTS

| | | | | |
|---|---|---|---|---|
| 5,237,148 | * | 8/1993 | Aoki et al. | 219/121.7 |
| 5,538,817 | * | 7/1996 | Smith et al. | 430/5 |
| 5,539,175 | * | 7/1996 | Smith et al. | 219/121.7 |
| 5,748,213 | | 5/1998 | Karita et al. | 347/63 |
| 5,948,289 | * | 9/1999 | Noda et al. | 219/121.69 |

FOREIGN PATENT DOCUMENTS

| | | | |
|---|---|---|---|
| 0 309 146 | | 3/1989 | (EP) . |
| 0 419 181 | | 3/1991 | (EP) . |
| 0 419 190 | | 3/1991 | (EP) . |
| 0 495 663 | | 7/1992 | (EP) . |
| 0 624 471 | | 11/1994 | (EP) . |
| 0 739 739 | | 10/1996 | (EP) . |
| 0625095 | * | 12/1997 | (EP) . |
| 5-338157 | * | 12/1993 | (JP) . |

* cited by examiner

*Primary Examiner*—Samuel M. Heinrich
(74) *Attorney, Agent, or Firm*—Fitzpatrick, Cella, Harper & Scinto

(57) ABSTRACT

A method for manufacturing an ink jet recording head involves forming discharge ports by irradiating a laser beam onto a member which becomes the discharge port plate through a mask having specific patterns thereon. The mask includes a transmission section which regulates the shape of the discharge ports, and an attenuation section formed on the outer circumference of the transmission section so that the further the attenuation section is from the transmission, the less the laser beam becomes. This method also involves forming the discharge ports by irradiating the laser beam through the mask to the member, and each port has a cross-sectional shape which gradually tapers from a rectangular shape at a side of the port connected with the liquid flow path to a circular shape at a recording liquid discharge side of the port.

9 Claims, 11 Drawing Sheets

METHOD OF MAKING INK JET RECORDING HEAD WITH TAPERED ORIFICE

BACKGROUND OF THE INVENTION

1. Field of the Invention

The present invention relates to an ink jet recording head that records by discharging recording droplets to a recording medium by use of the ink jet recording method for the adhesion thereof to it. The invention also relates to a method of manufacture therefor. More particularly, it relates to an ink jet recording head for discharging fine recording droplets stably at higher speeds in order to obtain images recorded in higher precision, and a method of manufacture therefor as well.

2. Related Background Art

With the ink jet recording head, recording (printing) is made by discharging the ink that serves as recording liquid from the fine discharge ports (orifices) as flying droplets which adhere to a recording medium (a paper recording sheet or the like). To structure the ink discharge unit of the ink jet recording head, there are laminated a resin member on a substrate provided with a plurality of discharge energy generating elements and lead electrodes on it in order to form a plurality of grooves that serve as ink liquid flow paths and a groove that serves as a common liquid chamber communicated with the plurality of liquid flow paths. To the resin member formed on this substrate, the glass ceiling plate provided with an ink supply opening is bonded to cover all the grooves for the formation of the liquid flow paths and the common liquid chamber.

In recent years, the above-mentioned glass ceiling plate is omitted, while the ink supply opening is added to the grooves that serve as the liquid flow paths and the common liquid chamber. Then, the resin ceiling plate is formed by means of injection molding or the like together with the orifice plate having discharge ports formed therefor. Such resin ceiling plate and the substrate provided with the discharge energy generating elements are bonded through an elastic member so that each of the discharge energy generating elements is fittingly arranged for each of the flow path grooves on the ceiling plate. In this manner, there has been developed an ink jet recording head formed by bonding the resin ceiling plate and the substrate.

FIG. 9 is a perspective view which shows the principal part of the ink jet recording head formed by bonding such resin ceiling plate and substrate. In FIG. 9, the second substrate that serves as the resin ceiling plate is partly broken for representation. As shown in FIG. 9, a plurality of discharge energy generating elements 701 for discharging ink are arranged in parallel for the first substrate 702. On the other hand, the resin second substrate 710 is structured by the ceiling plate portion 711 and the orifice plate portion 708. Here, the ceiling unit 711 is configured in such a manner that it is connected vertically with one surface of the orifice plate portion 708. On one surface of the ceiling plate portion 711, the ink supply opening 709 is arranged. Here, a hole extended from the ink supply opening 709 penetrates the ceiling plate portion 711 vertically. On the other surface of the ceiling plate portion 711, where the hole form the ink supply opening 709 is open, there are arranged a groove extendedly in parallel with the orifice plate portion 708 to serve as the common liquid chamber to retain ink temporarily, and a plurality of grooves communicated with the common liquid chamber 706 to serve as liquid flow paths which are extended on straight lines from the common liquid chamber 706 in the direction toward the orifice plate portion 708. On the leading edge portion of the orifice plate portion 708 to which the plurality of liquid flow paths 707 are extended, the holes are arranged to penetrate the orifice plate portion 708. Through these holes, the liquid flow paths 707 are communicated with the outside. These through holes on the orifice plate portion 708 become the ink discharge ports 705. The surface of the second substrate 710, where the grooves are provided for the common liquid chamber 706 and the liquid flow paths 707, and the surface of the first substrate 702, where the discharge energy generating elements 701 are formed, are arranged to face each other so that the discharge energy generating elements 701 are positioned with the corresponding liquid flow paths 707. Then, these surfaces are pressed with an elastic material (not shown) between them to bond the first substrate 702 and the second substrate 710 for the formation of the common liquid chamber 706 and the liquid flow paths 707. The first substrate 702 bonded together with the second substrate 710, and the wiring substrate 703, which is provided with driving circuits installed thereon to generate electric signals to be transmitted to the first substrate 702, are fixed on the base plate 704, thus forming the principal part 714 of the head.

Now, with the principal part 714 of the ink jet recording head shown in FIG. 9, an ink jet recording head is fabricated as represented in FIG. 10. Here, the head principal part 714 is integrally formed by the injection molding together with the grooves that become liquid flow paths 707 to supply ink (recording liquid) to the head principal part 714, the ceiling plate portion 711 provided with the ink supply opening 709, and the orifice plate portion 708 as shown in FIG. 10. Then, a part of the orifice plate portion 709, which is the plate portion of the integrally formed resin member, prepared for the formation of the discharge ports 705, is irradiated by excimer laser from the common liquid chamber side to from them. In this manner, the second substrate 710 is produced.

Now, with reference to FIGS. 11A to 11C, the description will be made of the operation of the ink jet recording head structured as described above. The interior of the common liquid chamber 706 is filled with ink supplied from the ink supply opening 709. The interior of each of the liquid flow paths 707 is also filled with the ink that has flown into it from the common liquid chamber 706. When each of the discharge energy generating elements 701 is supplied with electric power, thermal energy is generated as discharge energy. With the thermal energy thus generated, film boiling is created in ink on each of the discharge energy generating elements 701, hence air bubbles being formed in the liquid flow paths, respectively. By the development of each air bubble, ink that resides between the corresponding discharge energy generating element 701 and discharge port 705 is pressed toward the discharge port 705. Then ink is discharged from the discharge port 705.

However, the progress of recording technologies, particularly the progress in making the precision of recorded images more precise, is remarkable in recent years. As a result, it has been demanded to make recorded images highly precise not only in the conventional resolutions of from 360×360 dpi (dot per inch) and 600×600 dpi to 720×720 dpi, but also, in the extremely high resolution of 1200×600 dpi or the like.

In order to materialize highly precise images recorded by use of an ink jet recording head, it is necessary to make the recording droplets extremely small when discharged from each of the discharge ports. However, there is a problem encountered that it is very difficult to discharge the extremely fine recording droplets stably at high speeds by use of the ink jet recording head produced by the conventional art. Now, hereunder, such problem will be discussed with reference to FIGS. 11A to 11C which illustrate the conventional techniques.

In other words, there is a need for making the diameter of each discharge port smaller in order to make each recording droplet a small one. Then, when the discharge port is made smaller, the residing region of the fluid resistance component (the step 730 in FIGS. 11A to 11C) becomes larger in the portion that connects the discharge port with the liquid flow path. As a result, due to the presence of this fluid resistance component, the amount of reflection is increased against the discharge pressure waves when bubble is generated by the heater. This increased reflection disturbs the ink flow at the time of refilling. A flow disturbance of the kind tends to result in lowering the refilling frequency. Meanwhile, the enhancement of resolution as described earlier necessitates the increased numbers of recording droplets inevitably. Therefore, in order to secure the same printing speeds as those conventionally available, it is necessary to obtain a sufficient discharge frequency. This in turn requires the enhancement of refilling frequency.

In this respect, if each of the discharge energy generating elements should be driven at higher speeds for discharging smaller droplets just by making the diameter of each discharge port smaller, the refilling capability tends to become insufficient eventually, hence making it hardly attainable to obtain the discharge characteristics in good condition as desired.

Also, as another method for making recording droplets small ones, it is practiced to make the heater power smaller. However, although this method produces a favorable effect on the enhancement of the refilling frequency, it tends to results not only in reducing the discharge amount of recording droplets, but in reducing the discharge speeds. This tendency may invite the twisted flight of recording droplets or the like, and from the practical point of view, a method of the kind can hardly be regarded as a desirable one.

Further, it may be possible to enhance the refilling speeds by making the volume larger in the liquid flow paths and the discharge ports on the discharge port side than the energy generating device side, because this arrangement makes the amount of displacement smaller for each meniscus. However, if such volume is made larger just by shifting the energy generating devices to the liquid chamber side, the discharge efficiency of recording droplets becomes inferior, and in some cases, the disabled discharge of recording droplets may take place particularly when the heater power is made smaller.

As described above, no ink jet recording head has been developed to make a high quality printing possible by discharging small droplets at higher frequency.

SUMMARY OF THE INVENTION

In consideration of the problems discussed above, the present invention is designed. It is an object of the invention to provide an ink jet recording head capable of obtaining the volume of the liquid flow paths and discharge ports on the discharge port side more than the energy generating device side without making the distance from the heaters to the discharge ports greater, at the same time, presenting excellent refilling characteristics in order to secure a sufficient discharge speed of recording droplets.

In order to achieve the objective described above, the ink jet recording head of the present invention is provided with a plurality of discharge ports for discharging recording liquid, a discharge port plate having the discharge ports therefor, a liquid chamber for retaining the recording liquid, a plurality of discharge energy generating elements for discharging the recording liquid, a substrate having the plurality of discharge energy generating elements on one surface thereof, and a plurality of liquid flow paths extended in one direction for communicating the liquid chamber and the discharge ports, each having the rectangular sectional configuration, at the same time, including each of the discharge energy generating elements therein. The sectional shape of each of the discharge ports is circular on the end portion thereof on the recording liquid discharge side, at the same time, the sectional area of the discharge port end portion connected with the liquid flow path being made larger than that of the end portion of discharge port on the recording liquid discharge side, and the sectional shape of the discharge port is rectangular, while the discharge port is tapered to change its sectional shape from being rectangular to circular.

Also, the method for manufacturing an ink jet recording head of the present invention is provided with a plurality of discharge ports for discharging recording liquid, a discharge port plate having the discharge ports therefor, a liquid chamber for retaining the recording liquid, a plurality of discharge energy generating elements for discharging the recording liquid, a substrate having the plurality of discharge energy generating elements on one surface thereof, and a plurality of liquid flow paths extended in one direction for communicating the liquid chamber with the discharge ports, each having the rectangular sectional configuration, at the same time, including each of the discharge energy generating elements therein, and the discharge ports are formed by irradiating the laser beam on the member becoming the discharge port plate though a mask having specific patterns thereon. This mask that transmits the laser beam is provided with the transmission section that regulates the shape of the discharge port, and the attenuation sections formed on the outer circumference of the transmission section to enable the transmissivity of the laser beam to be made gradually smaller as each of the attenuation sections parts farther away from the transmission section, thus forming by use of the mask the discharge port that changes its sectional shape in the form of taper gradually from the end portion of discharge port connected with the liquid flow path having the rectangular sectional shape to the end portion of the discharge port on the recording liquid discharge side having the circular sectional shape.

Further, the discharge port may be provided with a symmetrically tapered part on the portion that is connected with the end portion on the recording liquid discharge side, which is symmetrically formed with respect to the axis of ink discharge direction.

Also, the discharge port may be provided with a portion that changes its taper angle on the way or may be provided a taper angle uniformly on the portion of the discharge port nearest to the liquid flow path.

With the structure thus arranged, it becomes possible to make the resistance component smaller on the portion that connects the discharge port and the liquid flow path. At the same time, it becomes possible to secure the volume of the liquid flow path on the discharge port side more than that of the energy generating device side without making the distance larger between the heat and discharge port. As a result, an ink jet recording head can be obtained with the improved refilling characteristics.

Further, the resistance component is made smaller particularly on the portion that connects the discharge port on the substrate side and the liquid flow path. Therefore, the discharge efficiency is enhanced more than the conventional head. In this way, it becomes possible to secure the sufficiently higher speeds for discharging recording droplets. Consequently, without making the heater area comparatively larger, small droplets can be discharged, while effectuating the enhancement of the refilling characteristics.

As described above, in accordance with the present invention, it is possible to repeatedly discharge smaller droplets at higher speeds, hence obtaining an ink jet recording head capable of printing images in high quality at higher speeds.

DETAILED DESCRIPTION OF THE PREFERRED EMBODIMENTS

Hereinafter, with reference to the accompanying drawings, the description will be made of the embodiments in accordance with the present invention.

(First Embodiment)

Figure 1A:
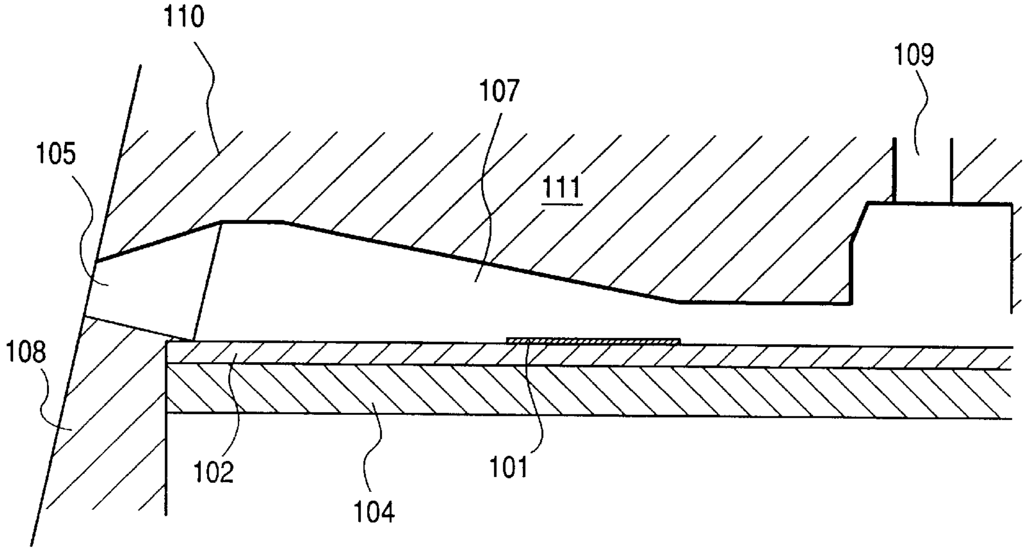
FIGS. 1A, 1B and 1C are a cross-sectional view, a plan view, and a perspective view, respectively, which illustrate an ink jet recording head most suitably in accordance with a first embodiment of the present invention.
Figure 1B:
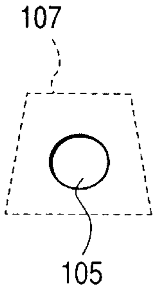
Figure 1C:
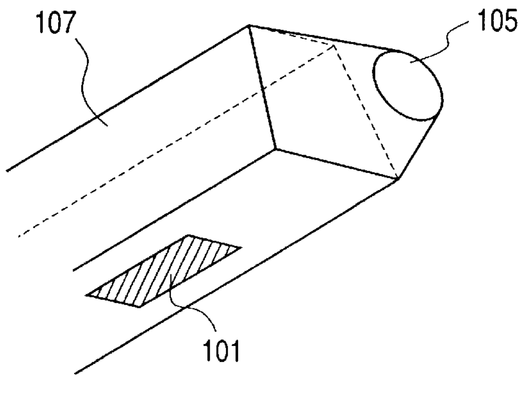

FIGS. 1A to 1C are a cross-sectional view, a plan view, and a perspective view, respectively, which illustrate an ink jet recording head most suitably in accordance with a first embodiment of the present invention. FIG. 1A is the cross-sectional view which shows a liquid flow path and a discharge port of the ink jet recording head. FIG. 1B is the plan view which shows the configuration of the liquid flow path and the discharge port represented in FIG. 1A. FIG. 1C is a perspective view which shows the structure of the circumference of the discharge port for the easier understanding of the relationship between the liquid flow path and the discharge port represented in FIG. 1A and FIG. 1B, respectively.

In accordance with the present embodiment, the ink jet recording head is provided, as shown in FIG. 1A, with the ink supply opening 109, the liquid common chamber 106 to retain ink serving as a recording liquid; the discharge port 105 to discharge ink in the common liquid chamber 106; and the liquid flow path 107 extended in one direction in order to conductively connect the common liquid chamber 106 and the discharge port 105. The ink jet recording head is also provided with each of the discharge energy generating elements 101 arranged therefor. The discharge port 105 connected with the leading end of the liquid flow path 107 is tapered so that it becomes gradually smaller toward the recording liquid discharge side. Also, as shown in FIGS. 1B and 1C, the sectional configuration of the end portion of the discharge port 105 on the recording liquid discharge side is circular, and the sectional configuration of the liquid flow path 107 is equally-footed trapezoidal in the direction perpendicular to the progressing direction of ink.

Also, the configuration of the portion that connects the discharge port 105 with the liquid flow path 107 is equally-footed trapezoidal to match the discharge port with that of the liquid flow path 107. Here, in accordance with the present invention, the end portion of the discharge port 105 is made circular on the recording liquid discharge side in order to reduce the creation of mist significantly when the discharge energy generating element 101 is driven at high speeds. Also, with the sectional configuration of the discharge port 105 which is tapered gradually from the equally-footed trapezoid to the circle, it becomes possible to make the fluid resistance component smaller, while securing a sufficient volume between the liquid flow path 107 and discharge port 105 on the discharge port side more than the discharge energy device 101 side, thus improving the refilling performance. Here, in accordance with the present embodiment, the sectional configuration of the liquid flow path and that of the portion connecting the discharge port 105 with the liquid flow path 107 are arranged to be equally-footed trapezoidal. However, it should be good enough if only the sectional configuration of the liquid flow path 107 is made rectangular with the flat substrate 102, which is provided with the discharge energy generating elements thereon, as the bottom of such rectangle to be formed. Also, it should be good enough if only the sectional configuration of the portion that connects the liquid flow path 107 with the discharge port 105 is made rectangular to match the discharge port with the liquid flow path.

The common liquid chamber 106 and liquid flow path 107 thus configured are formed by bonding the first substrate 102, which provided with discharge energy generating elements 101 thereon, and the second substrate 110 to be configured as described later. One surface of the second substrate where the respective grooves are formed for the provision of the common liquid chamber 106 and the liquid flow path 107 is bonded to the surface of the first substrate 102 on the discharge energy generating element side so that the each of the discharge energy generating elements 101 can be arranged correspondingly for each of the grooves that becomes each liquid flow path 107. Further, the first substrate 102 integrally arranged with the second substrate 110 as one body is mounted and fixed on the base plate 104.

The second substrate 110 is provided with the ceiling plate portion 111 having on it each of the grooves that becomes the common liquid chamber 106 and the liquid flow path 107, respectively, and also, provided with the orifice plate portion 108. The ceiling plate portion 111 is arranged to be perpendicular to it. Each of the liquid flow paths 107 extends from the common liquid chamber 106 toward the orifice plate 108. The orifice plate portion 108 is a plate member where discharge ports 105 are formed. On the orifice plate, through holes are provided each on the position to which each of the liquid flow paths 107 is extended, hence forming the discharge ports 105, respectively.

Figure 2:
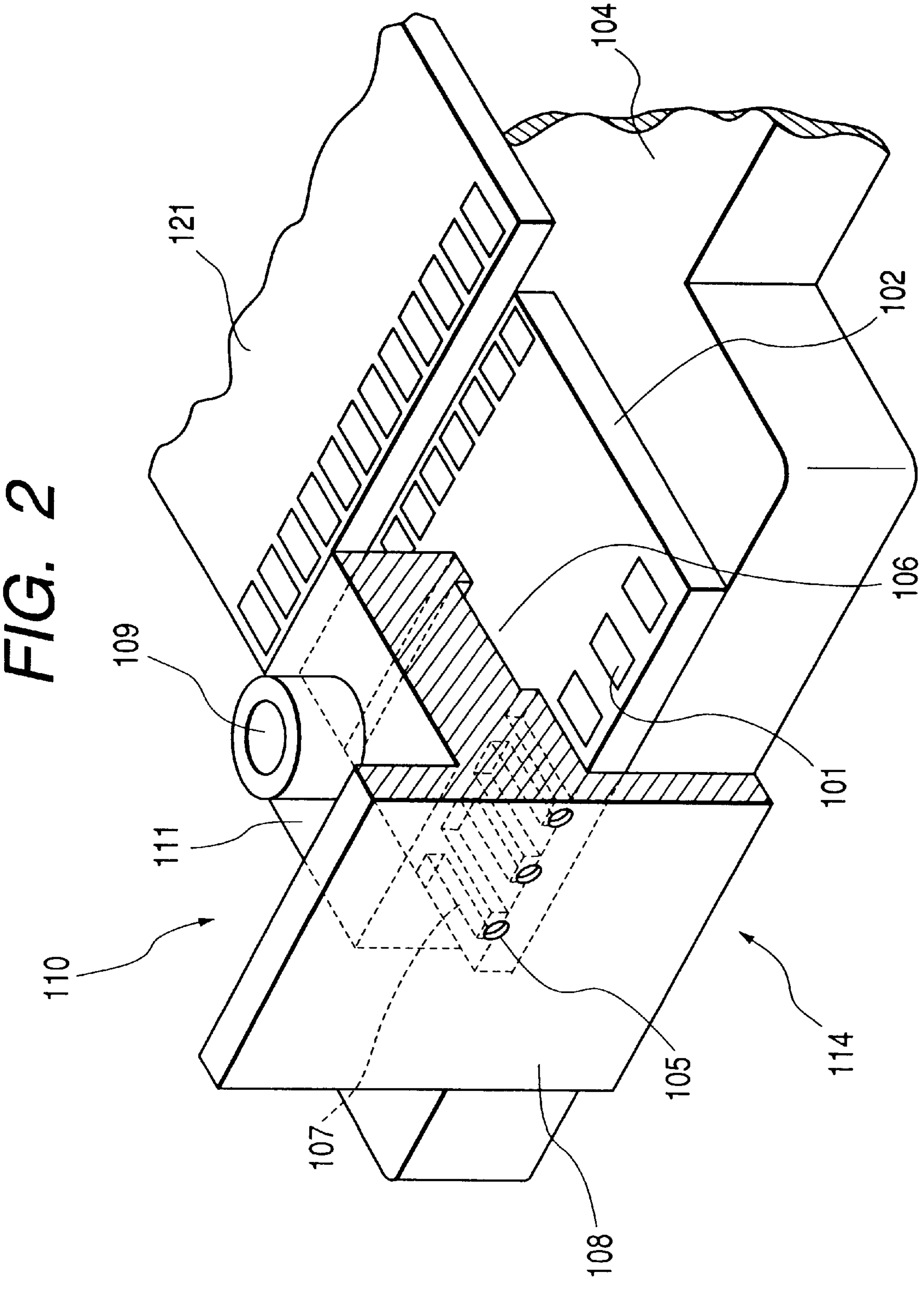
FIG. 2 is a perspective view which shows the principal part of the ink jet recording head provided with the discharge ports and liquid flow paths represented in FIGS. 1A, 1B and 1C.

FIG. 2 is a perspective view which shows the principal part of the ink jet recording head provided with a plurality of discharge ports 105, liquid flow paths 107 and common liquid chambers 106 each of which is as represented in FIGS. 1A to 1C. In FIG. 2, the second substrate 110 is partially broken for representation. As shown in FIG. 2, the second substrate 110 is structured by the ceiling plate portion 111 and the orifice plate portion 108, and configured to allow the ceiling plate portion 111 to be connected with the orifice plate portion 108 vertically. On one surface of the ceiling plate portion 111, the ink supply opening 109 is arranged. The hole extended from the ink supply opening 109 penetrates the ceiling plate portion 111 vertically. On the other surface of the ceiling plate portion 111 where the hole from the ink supply opening 109 is open, the groove that becomes the common liquid chamber 106 extends in parallel with the orifice plate portion 108. Being communicated with this groove that becomes the common liquid chamber 106, a plurality of grooves that become the liquid flow paths 107 are extended on straight lines toward the orifice plate portion 108. On the orifice plate portion 108 at the leading end of each of the liquid flow paths thus extended, each of the holes (ink discharge ports 105) is formed. Through these ink discharge ports 105, each of the liquid flow paths 107 is communicated externally. As described above, the surface of the second substrate 110 where each of the grooves are provided for the formation of the common liquid chamber 106 and the liquid flow paths 107 are positioned to face the surface of the first substrate 102 where the discharge energy generating elements 101 are formed so that each of the liquid flow paths 107 is arranged correspondingly for each of the discharge energy generating elements 101. Then, with an elastic member (not shown) being placed between these surfaces, the first substrate 102 and the second substrate 110 are pressed and bonded. With the first substrate 102 and second substrate 110 thus bonded together, the common liquid chamber 106 and the plural liquid flow paths 107 are formed. The first substrate 102 to which the second substrate 110 is bonded, and the wiring substrate 121 having on it the driving circuit for generating electric signals to the first substrate 102 are fixed on the base plate 104 to structure the head principal part 114.

Figure 3:
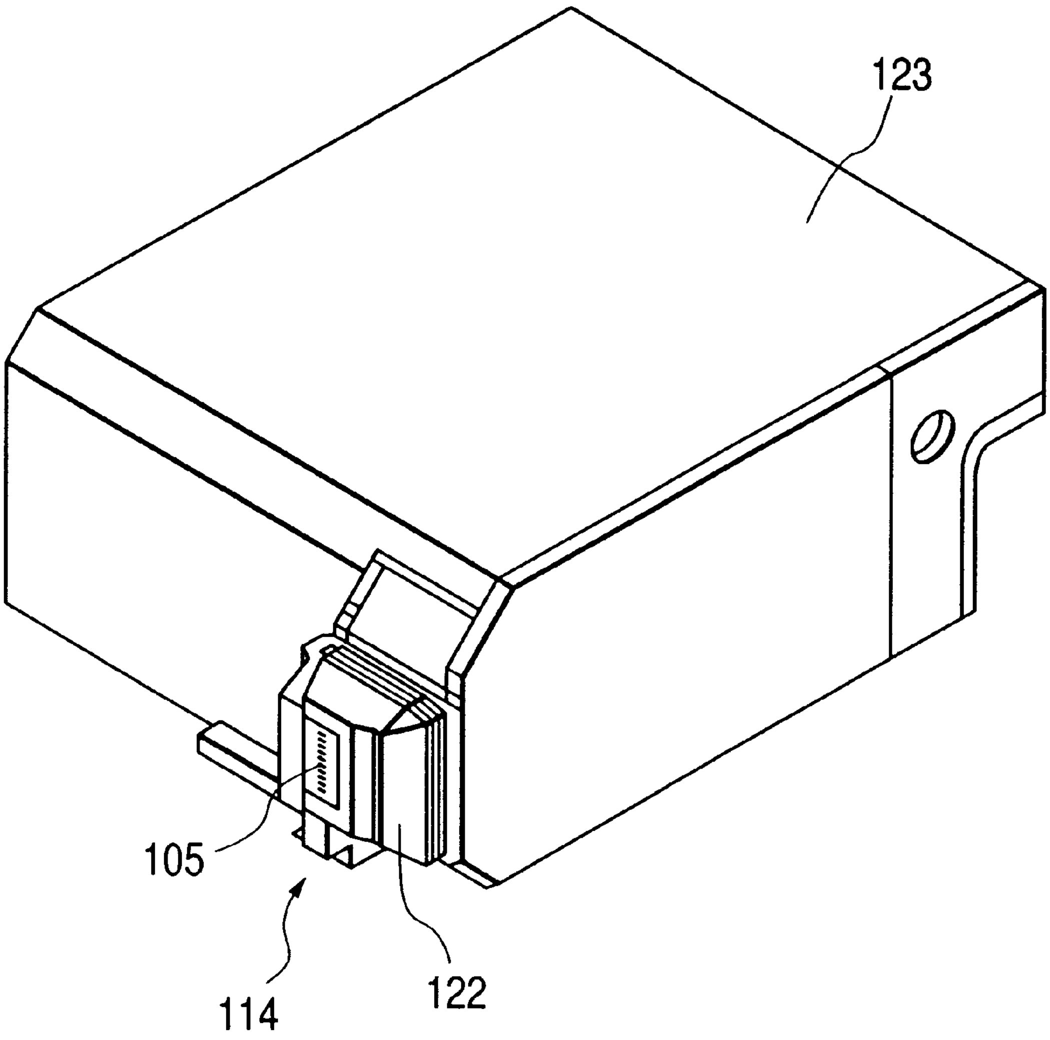
FIG. 3 is a perspective view which shows an ink jet recording head provided with the principal part of the ink jet recording head represented in FIG. 2.

FIG. 3 is a perspective view which shows an ink jet recording head provided with the head principal part 114 represented in FIG. 2. As shown in FIG. 3, the head principal part 114 is assembled on a cartridge 123 by means of an outer frame member 122 which contains a recording liquid supply member (not shown) or the like that supplies ink to the head principal part 114. In the interior of the cartridge 123, sponges or the like are housed to absorb ink for storage.

Figure 4:
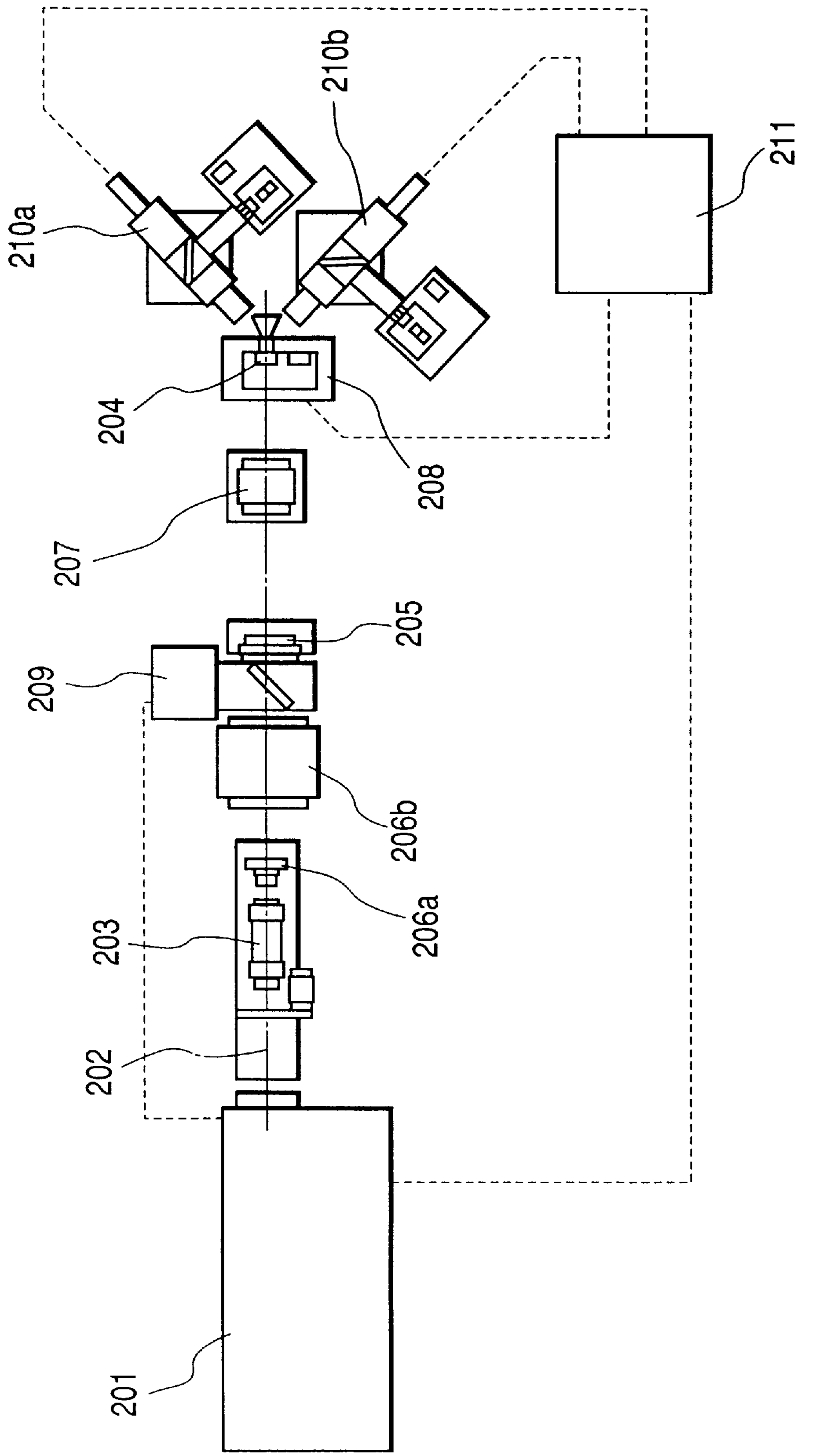
FIG. 4 is a structural view which schematically shows the laser processing apparatus used for the formation of the discharge ports and liquid flow paths represented in FIGS. 1A, 1B and 1C.

Now, with reference to FIG. 4 and FIG. 5, the description will be made of a method for forming the above-mentioned discharge ports 105. FIG. 4 is a structural view which schematically shows the laser processing apparatus used for the formation of the discharge ports 105. Here, the laser processing apparatus adopted for the present embodiment is different from the one used for the conventional art only in the mask to be used, and no other structural elements are the same as the conventional laser apparatus.

As shown in FIG. 4, the laser processing apparatus of the present embodiment comprises, on the laser optical axis 202 of the laser beam emitted from the laser light source 201, the beam shaping optical system 203, the illumination optical systems 206*a* and 206*b*, the mask 205, the projection optical system 207, and the work 204 in that order from the laser light source 201 side. The work 204 is the member whereby to produce the second substrate 110 shown in FIG. 1A and FIG. 2 before the discharge ports 105 are formed.

The beam shaping optical system 203 is to shape the laser beam from the laser light source 201. The illumination optical systems 206*a* and 206*b* are to uniform the intensity of laser beam. For the mask 205, the patterns are formed as shown in FIG. 5, which will be described later, in accordance with the processing form of the work 204. The projection optical system 207 is arranged to focus the laser beam, which is transmitted through the mask, on the processing surface in a specific magnification. In accordance with the present embodiment, the projection optical system 207 is used in a specific magnification of ¼ and resolution of 0.002 mm. The resolution of the projection optical system 207 means the minimum size obtainable on the processing surface, in which the patterns of the mask 205 can be focused on the surface of the work 204. Thus, if the pattern that should be formed on the mask is 0.008 mm or less, which is the quotient of the resolution (0.002 mm) of the projection optical system 207 divided by the specific magnification (¼), it is impossible to focus such pattern on the work 204.

Also, on the laser optical axis 202 between the illumination optical system 206*b* and the mask 205, there is arranged a device (not shown) which is provided with a power monitor unit 209 for measuring the intensity of the laser beam from the illumination optical system 206*b*. The work 204 is mounted on the work mount 208, and on both sides of the work 204 with respect to the optical axis, the observation systems 210*a* and 210*b* are arranged and used for positioning the work 204. The observation system 210*a* and 210*b*, the laser light source 201, and the work mount 208 are controlled by means of the control system 211.

Figure 5:
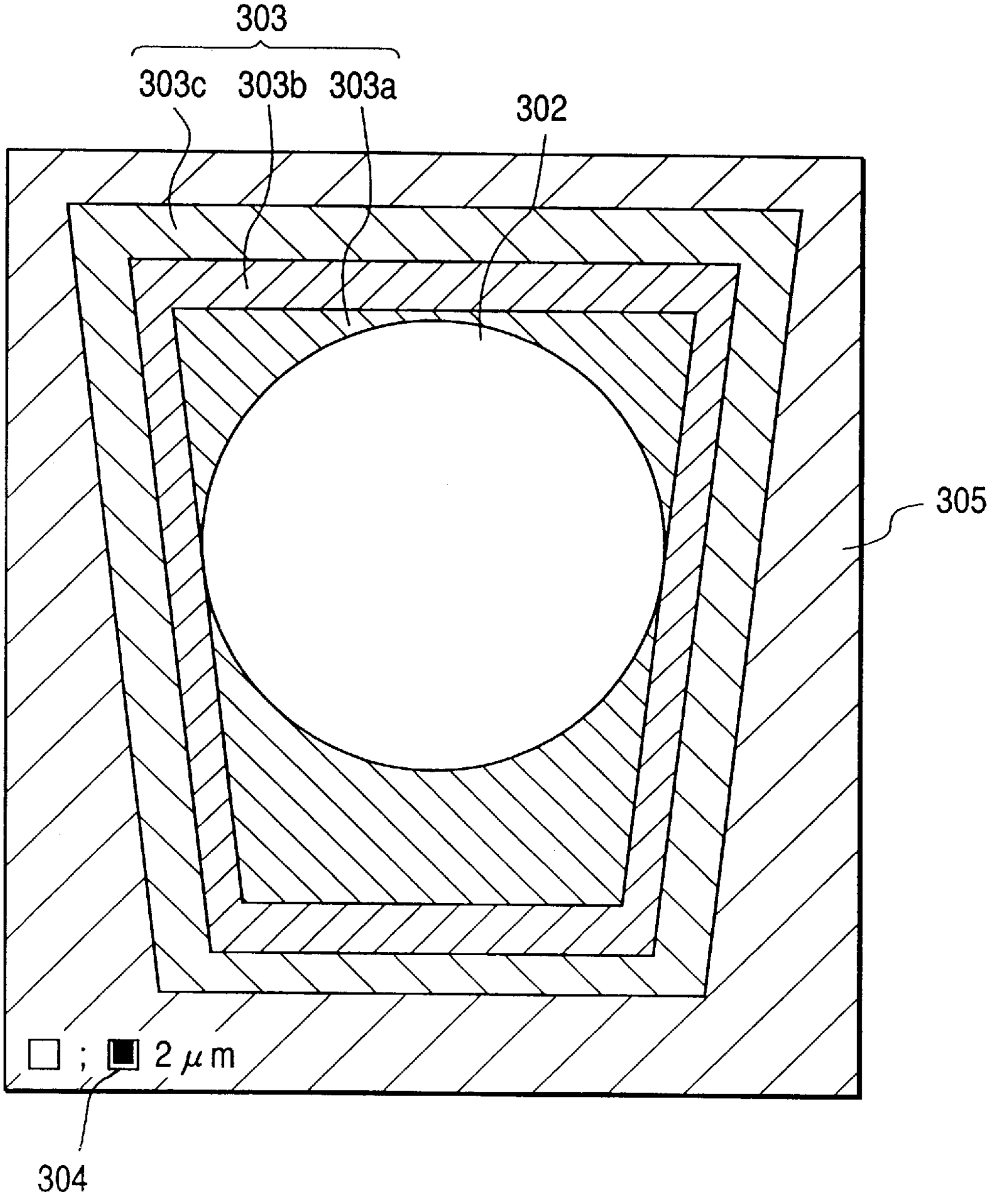
FIG. 5 is an enlarged view which shows the mask used for the laser processing apparatus represented in FIG. 4.

FIG. 5 is an enlarged view which shows one pattern of the mask 205 used for the laser processing apparatus represented in FIG. 4. On the mask 205, 128 of the same patterns as shown in FIG. 5 are arranged at pitches of 0.282 mm. With such patterns on the mask 205, it allows 90% of the laser beam from the laser light source 201 to be transmitted as shown in FIG. 5. Each pattern on the mask 205 comprises a circular transmission section 302 that allows the laser beam from the laser light source to be transmitted to regulate the configuration of the discharge port 105; attenuation sections formed on the outer circumference of the transmission section, each of which enables the transmissivity of the laser beam to be reduced gradually by 10% as it is located farther away from the transmission section 302; and a light shielding section 305 formed on the outer circumference of the attenuation sections 303, the transmissivity of the laser beam of which is 20%.

The attenuation sections 303 are formed by three extinction portions 303*a*, 303*b*, and 303*c* each with the different laser beam transmissivity, respectively. On the outer circumference of the transmission section 302, the attenuation section 303*a* whose transmissivity is 50% is formed. On the outer circumference of the attenuation section 303*a*, the attenuation section 303*b* whose transmissivity is 40% is formed, and on the outer circumference of the attenuation section 303*b*, the attenuation section 303*c* whose transmissivity is 30% is formed. In this manner, the transmissivity of the laser beam changes by 10% in the direction from the attenuation sections 303 to the light shielding section 305 one after another.

The external shape of the attenuation sections 303 is equally-footed trapezoidal of 0.224 mm on the upper side, and 0.156 mm on the lower side, in a height of 0.176 mm. With this trapezoidal shape, the configuration and size of the surface of the tapered liquid flow path 107*b* which is in contact with the liquid flow path 107*a* are regulated. The transmission section 302 is circular of 0.164 mm diameter.

Also, the attenuation sections 303 function like negative portion of the mask 205, and formed by inlaying a plurality of square extinction elements 304 each in a size of 0.002 mm per side. The extinction element 304 shown on the lower left side in FIG. 5 is the enlargement of the actual extinction element 304 for representation. The size of this extinction element 304 (0.002 mm) is smaller than the quotient, 0.008 mm, obtainable by dividing the resolution (0.002 mm) of the projection optical system 207 described earlier by the specific magnification (¼). As a result, one piece of the extinction element 304 is not focused on the work 204 by means of the projection optical system 207. However, by the extinction element 304, the laser beam is partly reflected or absorbed, and the laser beam which is incident upon the attenuation sections 303 is attenuated. Therefore, with many more numbers of extinction elements 304 being inlaid, the corresponding attenuation sections can be formed in a lower transmissivity accordingly. In this case, it is necessary to make an arrangement so that a plurality of extinction elements 304 are not aggregated together to make the size of aggregated elements more than 0.008 mm which is the quotient obtainable by dividing the resolution (0.002 mm) of the projection optical system 207 by the specific magnification (¼). When the size of the aggregated extinction elements 304 becomes more than 0.008 mm, the image of such aggregated elements is focused on the work 204 eventually. As a result, the laser beam cannot be attenuated uniformly.

With the transmissivity of the laser beam being 20% on the light shielding section 305, the energy density of the laser beam, which is converged by the projection optical system 207 after being transmitted through the light shielding section 305, becomes less than the processing threshold value of the work 204. Hence, the work 204 is not processed.

With the laser processing apparatus thus structured, the laser beam that transmits the interior of the transmission section 302 of the mask 205 is adjusted to make its energy density at 1 J/cm·puls on the processing surface of the work 204 when the laser beam has transmitted 90% of this section. Then, the laser beam is irradiated on the processing surface of the work 204 with 300 puls at 100 Hz for processing. The work 204 is prepared to be in the shape of the second substrate 110 as shown in FIG. 2, and the grooves that become the liquid flow paths 107 and the common liquid chamber 106 are also formed as shown in FIGS. 1A to 1C and FIG. 2, but the discharge ports 105 yet to be formed. Therefore, the leading end of each liquid flow path is blocked by the orifice plate portion 108. The laser beam is irradiated on the orifice plate portion 108 from the liquid flow path 107 side for processing. Thus, the surface of the orifice plate portion 108 on the leading end of the liquid flow paths 107 is the processing surface. Now, the description will be made of the operation of the laser processing apparatus shown in FIG. 4.

The laser beam emitted from the laser light source is shaped by means of the beam shaping optical system 203, and the intensity of the laser beam is uniformed by means of the illumination optical systems 206*a* and 206*b* to be incident upon the mask 205. Of the laser beam that enters the mask 205, the one that transmits the mask 205 is converged on the processing surface of the work 204 in a magnification of ¼ by means of the projection optical system 207. At this juncture, the pattern formed on the mask 205 is focused on the processing surface of the work 204 in the magnification of ¼ by means of the projection optical system 207. The processing surface of the work 204 is then processed by abrasion or the like in accordance with the pattern on the mask 205.

The image formed on the processing surface of the work 204 is such that since the pattern on the mask 205 is reduced to a ¼, the image that projects the circle of 0.164 mm diameter at the transmission section 302 becomes a circle of 0.041 mm on the processing surface of the work 204. The hole that penetrates the orifice plate portion 108 is formed by the application of the laser beam that has transmitted this transmission section 302 for the formation of each discharge port 105. The diameter of the discharge port 105 thus formed on the end portion of the recording liquid discharge port side is smaller than the circle of 0.041 mm diameter which is the projected image on the processing surface because of the characteristics of the laser processing. In accordance with the present embodiment, it is possible to obtain the discharge port whose diameter is 0.033 mm on the end portion of the recording liquid discharge port side.

Also, the laser beam that transmits each attenuation section 303 is being changed to the laser beam having lower energy densities as it is away externally from the transmission section 302. Therefore, the orifice plate portion 108 on the outer circumference of the discharge port 105 is processed in a depth corresponding to the energy density of the laser beam. Then, the processing depth thereof becomes gradually shallower as it is farther away from the end portion of the liquid discharge port 105 on the recording liquid discharge side. As a result, it becomes possible to obtain the tapered discharge port 105 without any steps on the way.

As in the transmission section 302, the projected equally-footed trapezoidal image of 0.224 mm on the upper bottom and 0.156 mm on the lower bottom in a height of 0.176 mm, which is the outer shape of the attenuation section 303, becomes the equally-footed trapezoidal shape of 0.056 mm on the upper bottom and 0.039 mm on the lower bottom in the height of 0.044 mm on the processing surface. However, this trapezoidal projection image is almost the same as the sectional configuration of the liquid flow path 107. The energy density of the laser beam that has transmitted the light shielding section 305 of 20% transmissivity becomes equal to or less than the processing threshold value of the work 204. Therefore, the equally-footed trapezoidal outer shape of the attenuation sections 303 serves to regulate the configuration of the discharge port 105 on the liquid flow path 107 side. As a result, the step (resistance component) is significantly reduced on the boundary between the discharge port 105 and the liquid flow path 107. In this way, it becomes possible to produce the second substrate 110 provided with each discharge port 105 as shown in FIGS. 1A to 1C. In accordance with the present embodiment, since the 128 patterns of the one shown in FIG. 5 are formed on the mask 205, it is possible to obtain the second substrate 110 having 128 discharge ports of 0.033 mm diameter each for it.

The second substrate 110 thus processed is bonded to the first substrate 102 as shown in FIG. 2 to produce an ink jet recording head. With such ink jet recording head, printing is performed actually with the result that the speed of ink droplet discharges is stabilized: it is more stabilized than the conventional one particularly when printing is performed at higher speeds. Moreover, when smaller droplets are discharged, the discharge speeds are stabilized, and at the same time, the discharge speeds are enhanced. Also, the generation of ink mist is reduced when smaller droplets are discharged. As a result, it becomes possible to record images in higher precision.

In accordance with the present embodiment, as each of the attenuation sections 303 of the mask 205 becomes farther away from the circumference of the transmission section 302, the transmissivity of the laser beam is reduced by 10%. However, it may be possible to arrange the structure of the attenuation sections 303 so that the transmissivity is made changeable by a smaller percentage, hence reliably forming the tapered liquid flow path 107*b* with its surface being processed more smoothly. More ideally, it is desirable to arrange the structure so that the transmissivity becomes 20% on the boundary between the attenuation section 303 and the light shielding section 305 after the transmissivity has continuously been reduced from 50% as each of the attenuation sections 303 parts farther away from the transmission section 302.

Also, in accordance with the present embodiment, the transmissivity of the attenuation section 303*c* which is arranged on the most external side of the attenuation sections 303 is set at 30%, but this transmissivity may be increased to 40%. Thus, for example, the transmissivity of the attenuation section 303*b* is set at 45%. In this way, the attenuation sections 303 may be structured so that the transmissivity thereof is made changeable by 5%, respectively. With the mask having such pattern, the laser processing may be performed to produce an ink jet recording head which is able to demonstrate the same effect as described above.

Also, in accordance with the present embodiment, the outer shape of the attenuation sections 303 of the mask 205 is arranged to be an equally-footed trapezoid of 0.224 mm on the upper bottom and 0.156 mm on the lower bottom in a height of 0.176 mm. Then, the shape of the equally-footed trapezoidal image projected on the processing surface is made agreeable with the sectional configuration of the liquid flow path 107. However, if the projected image on the processing surface and the section of the liquid flow path 107 are in one identical shape, there is a fear that a great resistance component may be created locally on the boundary between the processed discharge port 105 and liquid flow path 107 when the laser processing is performed with the positions of the mask 205 and the work 204 as they are, which are slightly deviated between them on the laser processing apparatus shown in FIG. 4. Therefore, in order to improve the production yield for the intended laser processing, the size of the outer shape of the attenuation sections 303 of the mask 205 should be made larger by approximately 10% to enable the liquid flow path 107 portion to be processed simultaneously.

In this case, the laser beam, which is irradiated on the common liquid chamber 106 side which may constitute the partition wall or the like of the adjacent liquid flow paths 107 themselves, tends to weaken its intensity, because such laser beam has transmitted the attenuation section 303*c* whose transmissivity is 30%. As a result, the processing depth becomes shallower. However, the portion thus processed shallower, such as the partition walls of the liquid flow path 107 on the common liquid chamber side, does not produce any unfavorable effect on ink discharges even if irregularities are formed slightly on such portion. Here, there is no particular problem to be encountered. There is no influence exerted, either, on the formation of the discharge port 105 as shown in FIGS. 1A to 1C even if the mask 205 and work 204 are slightly deviated when positioned.

In consideration of the aspects described above, the outer shape of the attenuation sections 303 is arranged to be the equally-footed trapezoid of 0.246 mm on the upper bottom and 0.172 mm on the lower bottom in a height of 0.194 mm. Then, the laser processing is performed by use of the mask with the arrangement of 128 patterns at pitches of 0.282 mm, each having the wider region for the attenuation sections 303*a*, 303*b*, and 303*c*, respectively, along the wider external shape of the attenuation sections 303 thus formed. In this way, the second substrate 110 provided with the discharge ports 105 becomes obtainable.

Here, in order to improve the production yield of the second substrate 110 when ink jet recording heads are manufactured in a large scale, the outer shape of the attenuation sections 303 of the mask 205 should be made slightly larger, and it is desirable to perform the laser processing, with the projected image of the outer shape of the attenuation sections 303 being made larger than the sectional configuration of the liquid flow path 107 on the work 204.

Also, it is possible to manufacture an ink jet recording head having the same effect as described above by the performance of laser processing with the mask having the pattern whose transmissivity is made changeable by 5% provided that the transmissivity of the attenuation section 303*a* is set at 50%, 303*b* at 45%, and 303*c* at 40% as each of the attenuation sections parts farther away from the transmission section 302 as described earlier, while the outer shape of the attenuation sections 303 is made larger approximately by 10%. However, if the transmissivity of the attenuation section 303*c* is made larger than 35%, the wall surface of the liquid flow path 107 is partly processed. It is therefore preferable to set the transmissivity of the attenuation section 303*c* at 35% or less.

Further, in accordance with the present embodiment, the extinction element 304 of the mask 205 is made a square of 0.002 mm per side. Then, it is made smaller than the quotient of 0.008 mm obtainable by dividing the resolution (0.002 mm) of the projection optical system 207 by the specific magnification (¼). In this way, the laser beam is attenuated by means of the attenuation sections 303 to process the wall surface of the tapered liquid flow path 107*b* smoothly as described earlier. However, depending on the condition of the work 204 and that of the laser processing, it is not necessarily to make the size of the extinction element 304 smaller than 0.008 mm. Now, hereunder, the reasons therefor will be described.

Here, for example, it is assumed that a pattern whose size is 0.004 mm is projected on the work 204 in the performance of the laser processing by use of the projection optical system 207 whose resolution is 0.002 mm and specific magnification is ¼ as described for the present embodiment. In this case, the projected image has a larger resolution. Then, on the processing surface of the work 204, the pattern whose size is 0.004 mm is formed. However, when this 0.004 mm pattern is engraved to a depth of 0.01 mm from the processing surface, the 0.004 mm pattern is collapsed eventually due to the thermal influence exerted at the time of laser processing. Then, there is a fear that the processed surface does not present the anticipated form of the pattern in some cases. The size that allows the work 204 to be processed exactly as the form of pattern may vary depending upon the energy density of the laser beam to be irradiate, the period of time during which the laser beam is irradiated, the material of work 204, or some others. Depending on these factors, the minimum dimension should be determined to allow the work 204 to be processed exactly as the pattern to be adopted.

Now, therefore, if the minimum value is adopted as the processing resolution, it becomes impossible to form on the work 204 any pattern that may be smaller than the processing resolution determined by the processing condition and the material of the work 204. However, in this case, too, the wall surface of the tapered discharge port 105 can be processed smoothly by making the size of each extinction element 304 of the mask 205 smaller than the quotient obtainable by dividing the processing resolution of the projection optical system 207 by the specific magnification so that the laser beam is attenuated by the attenuation sections 303 formed by inlaying such extinction elements 304.

When the work 204 is processed deeper, it is generally observed that the processing resolution at that time becomes larger than the resolution of the projection optical system. As a result, by determining the size of the extinction element in accordance with the processing resolution as described above, the attenuation sections 303 can be formed by the extinction element which is made larger than the one determined on the basis of the resolution of the projection optical system 207. Consequently, it becomes easier to produce the mask 205, thus minimizing the costs of manufacture.

Now, for the mask 205, the size of the extinction element 304 is made smaller than the quotient obtainable by dividing the processing resolution by the resolution of the projection optical system 207. Then, the laser beam can be attenuated uniformly by means of the attenuation sections 303 formed by the extinction elements 304, hence making it possible to manufacture the same ink jet recording heads.

Here, in accordance with the present embodiment, polysulfone resin is used as material for the second substrate, and the laser beam emitted from the laser light source 201 is the Kr—F excimer laser whose wavelength is 248 nm.

Also, as the martial for the mask 205, synthesized quarts or the like having a good laser transmissivity is used for its transmission section of the laser beam. Then, for the light shielding section 305, the chromium layer is used. Also, one piece of the chromium layer of 0.002×0.002 is used for each of the extinction elements 304 of the attenuation sections 303.

(Second Embodiment)

Figure 6:
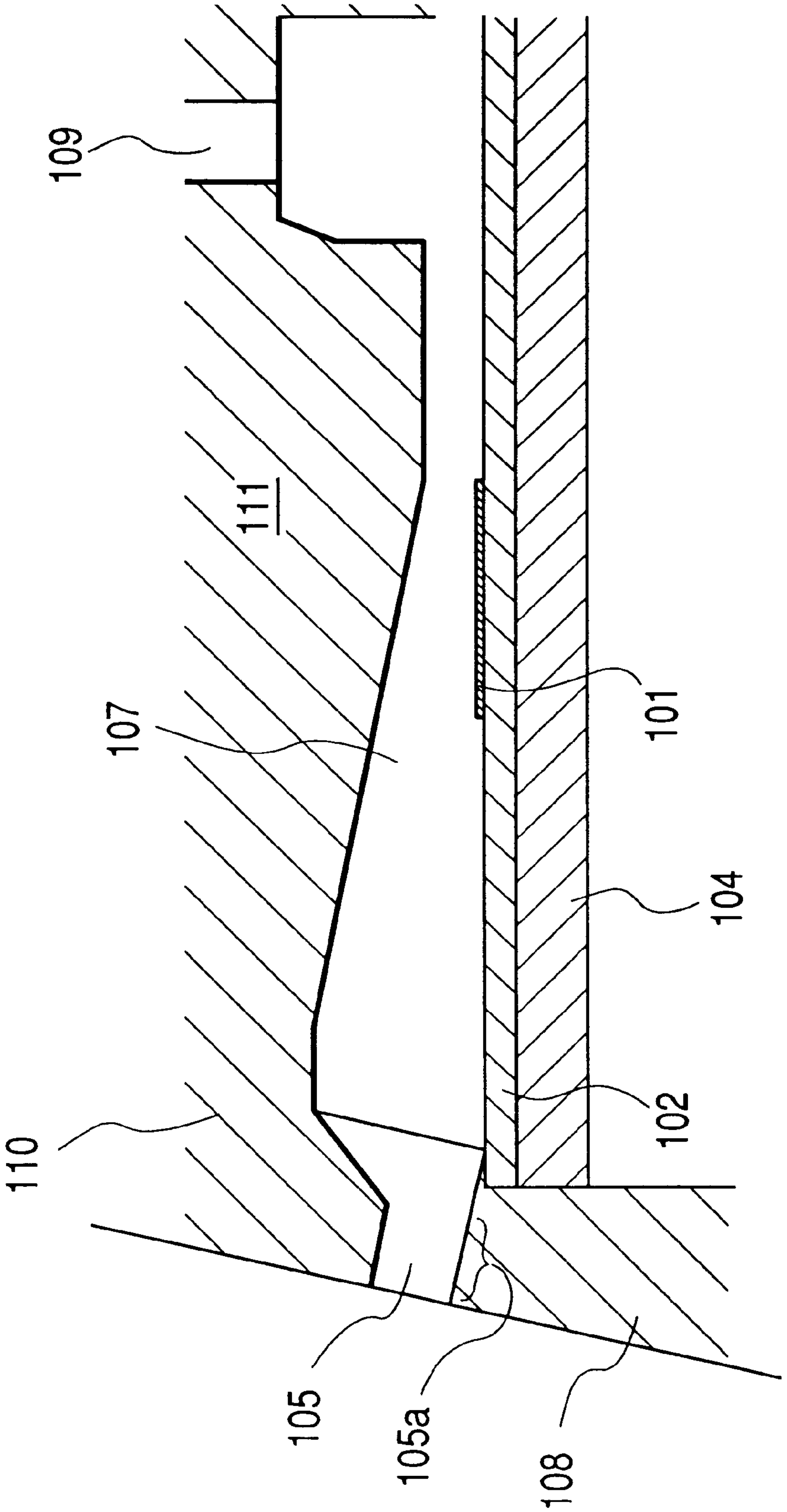
FIG. 6 is a cross-sectional view which shows the ink jet recording head most suitably in accordance with a second embodiment of the present invention.

FIG. 6 is a cross-view which shows an ink jet recording head most suitably in accordance with a second embodiment of the present invention.

In accordance with the present embodiment, the taper configuration of the discharge port 105 changes on the way as shown in FIG. 6. Also, there is provided a symmetrically tapered portion 105*a* on the portion connected with the discharge port 105 on the end portion of the recording liquid discharge side, which is symmetrically tapered with respect to the axis of the ink discharge direction.

Then, with such symmetrically tapered portion 105*a* provided for the discharge port 105, it is made possible to stabilize the discharge direction of recording droplets, thus reducing the twisted discharge thereof.

Therefore, even if the difference between the sectional area of the liquid flow path and that of the discharge port is large, it is possible to position the discharge port 105 as desired with respect to the liquid flow path 107 by changing its taper configuration on the way with the provision of this symmetrically tapered portion 105*a*. With the arrangement thus made, there is an advantage that the volume of the liquid flow path 107 can be secured in the height direction when each of the liquid flow paths 107 should be arranged in higher density.

Also, in consideration of the enhancement of the discharge efficiency, it is preferable to position each discharge port 105 nearer to the position of the substrate 102. As shown in FIG. 6, the sectional configuration of the discharge port 105 is tapered uniformly on the portion nearest to the substrate 102, while the taper configuration of the ceiling plate 111 side changes on the way. With the discharge port 105 thus structured, the fluid resistance component is made smaller on the portion of the discharge port 105 nearer to the substrate 102. As a result, particularly when small liquid droplets should be discharged for recording by means of comparatively small bubbling, it becomes more effective to secure a sufficient discharge speed.

Here, the symmetrically tapered portion 105*a* should be good enough if only the taper angles are made symmetrical at least in two directions, one of which is in parallel with the substrate 102 on the axis of the ink discharge direction, and the other is perpendicular to the substrate 102 (the sectional direction shown in FIG. 6).

Figure 7:
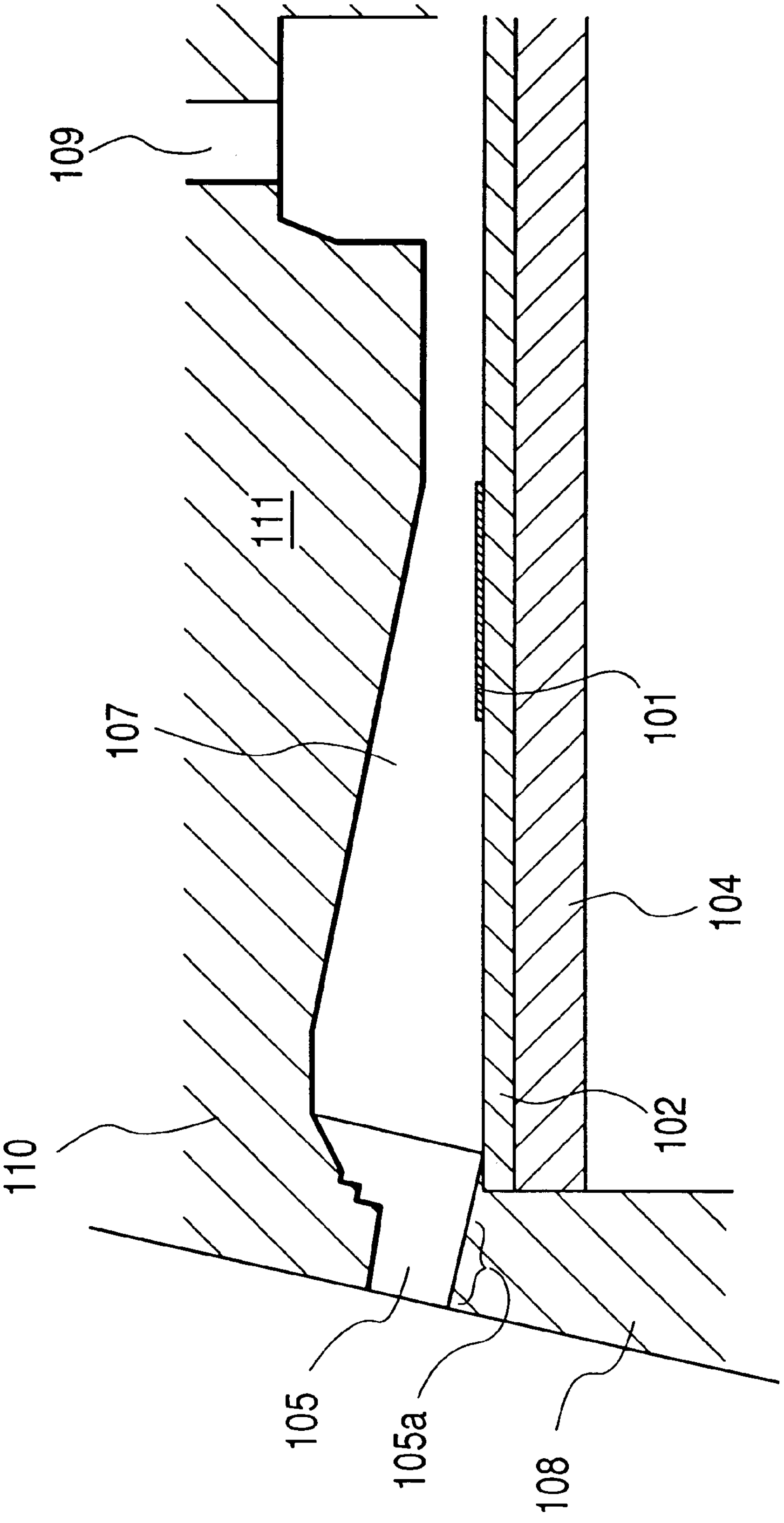
FIG. 7 is a cross-sectional view which shows the variation of the ink jet recording head in accordance with the second embodiment of the present invention.

Also, there is no problem even if the portion where the taper configuration changes has fine steps in its shape as shown in FIG. 7.

(Third Embodiment)

Any one of the structures described above is such as to be provided with one discharge energy generating element 101 in one liquid flow path 107. However, in accordance with the present embodiment, the structure is arranged so that a plurality of discharge energy generating elements 101 is arranged in one liquid flow path 107.

Figure 8:
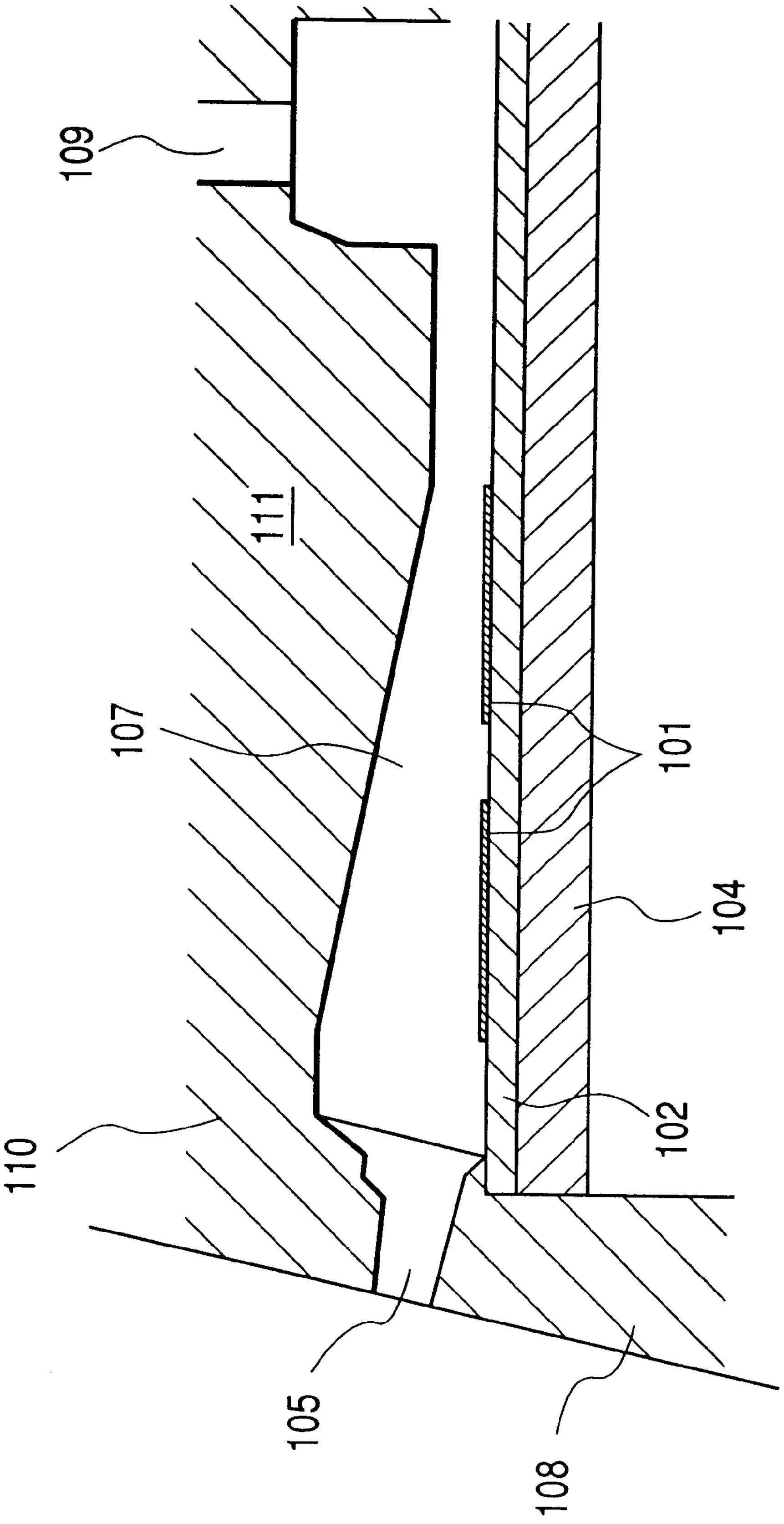
FIG. 8 is a cross-sectional view which shows the ink jet recording head most suitably in accordance with a third embodiment of the present invention.
Figure 9:
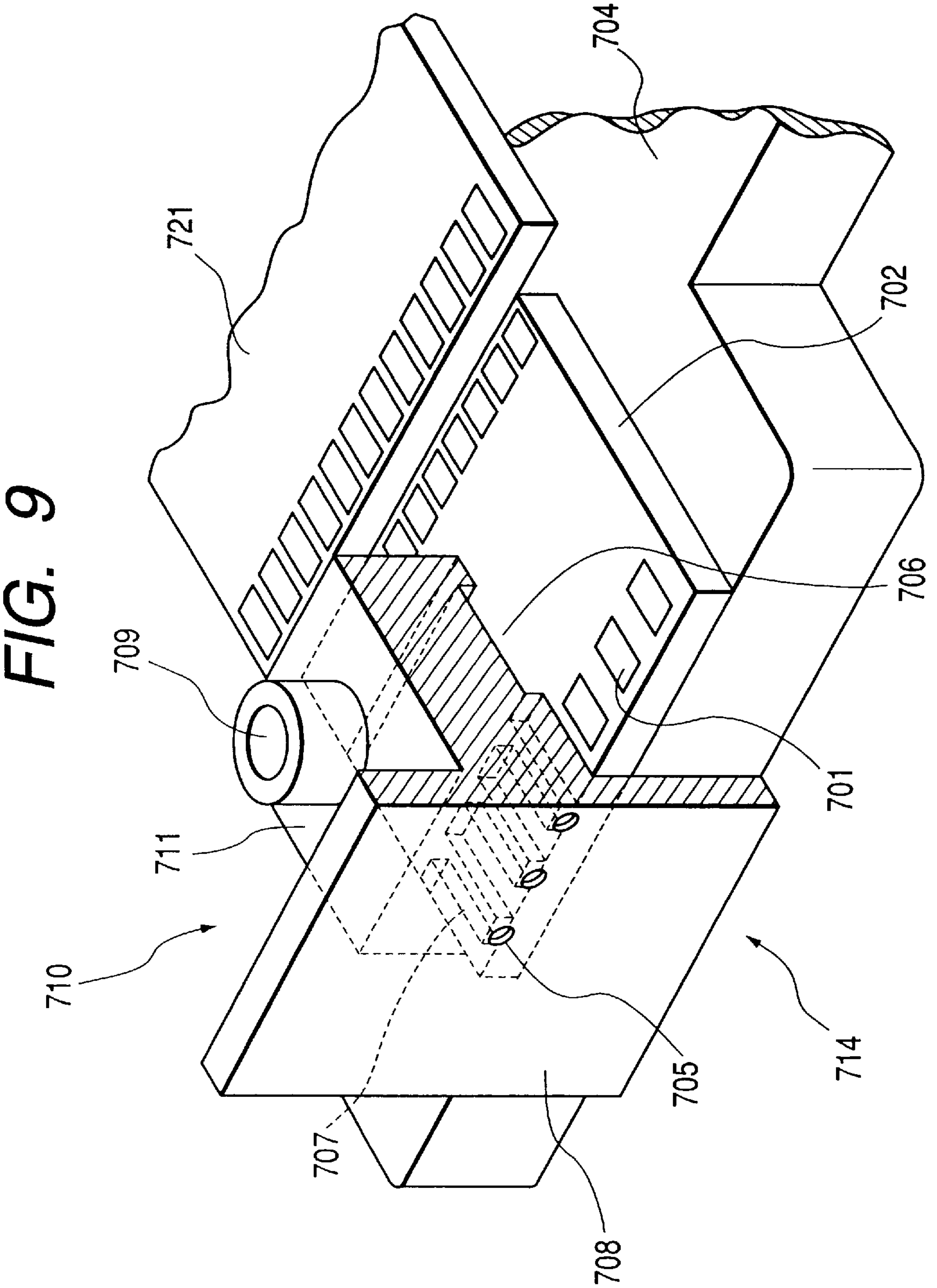
FIG. 9 is a perspective view which shows the principal part of the ink jet recording head in accordance with the conventional art.
Figure 10:
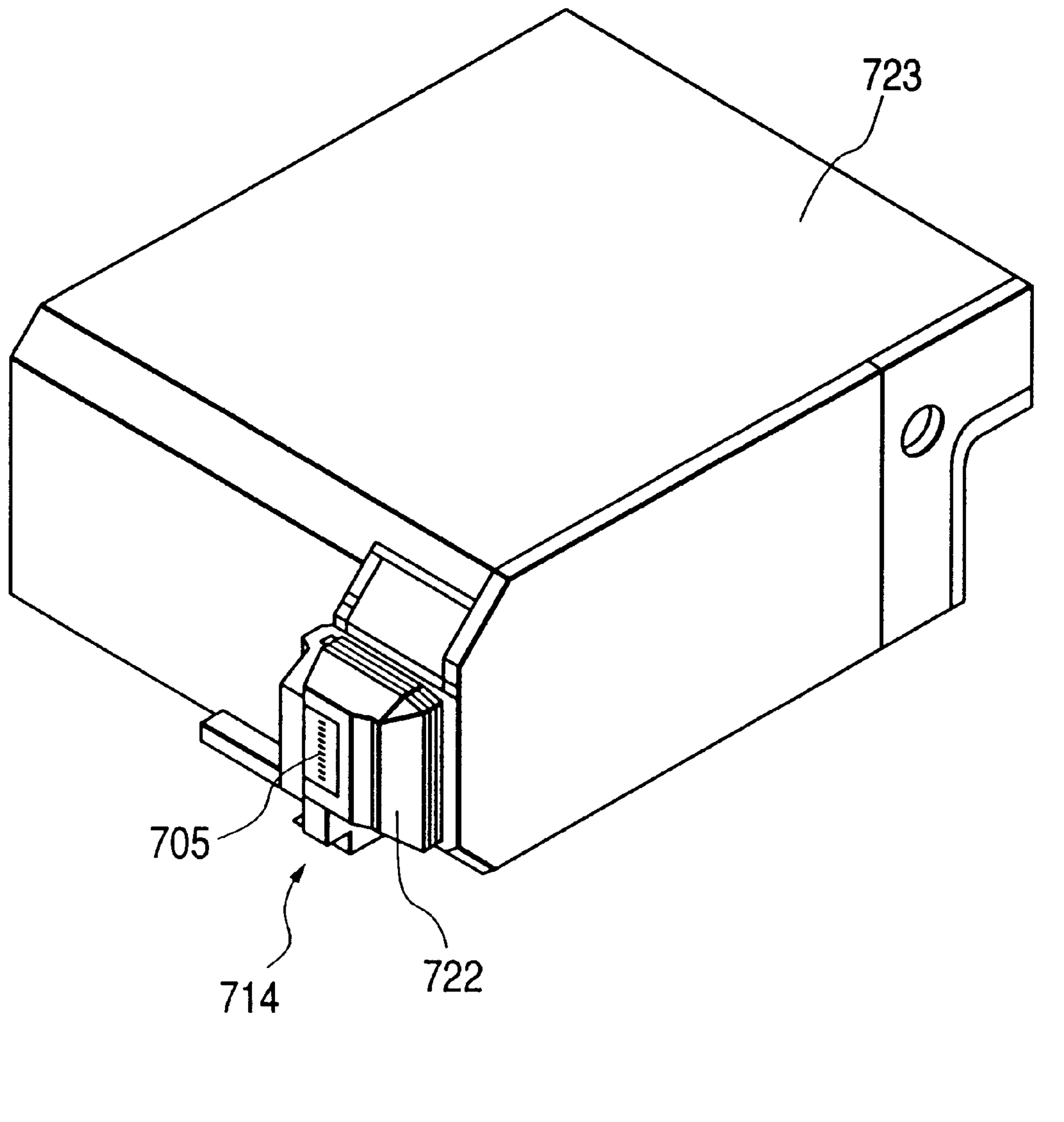
FIG. 10 is a perspective view which shows the ink jet recording head provided with the principal part of the ink jet recording head represented in FIG. 9.
Figure 11A:
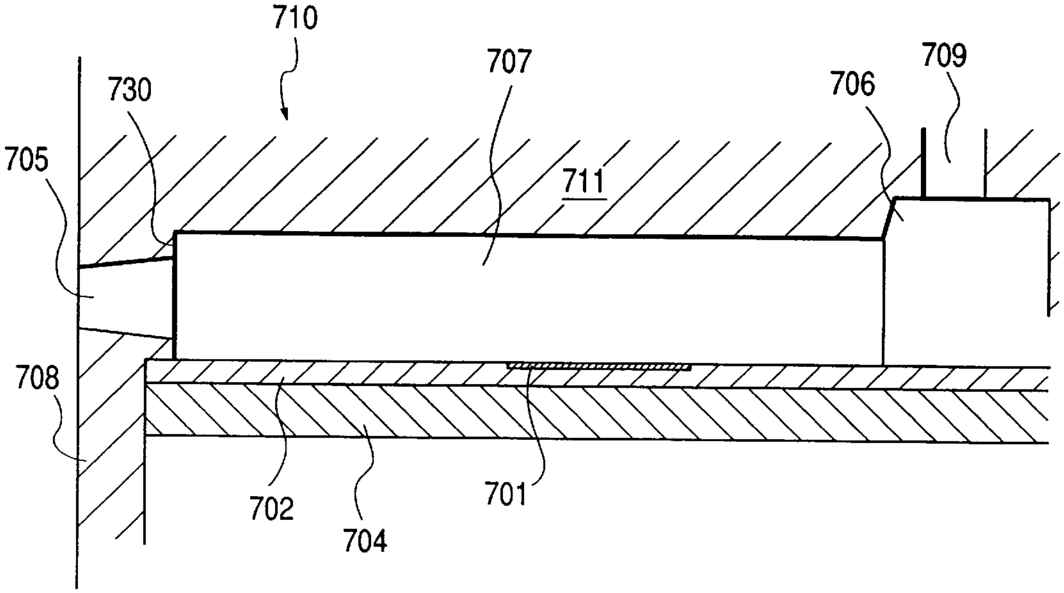
FIGS. 11A, 11B and 11C are a cross-sectional view, a plan view, and a perspective view, respectively, which illustrate the discharge ports and liquid flow paths represented in FIG. 9.
Figure 11B:
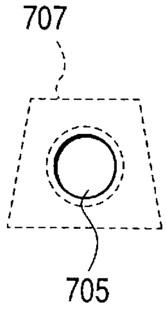
Figure 11C:
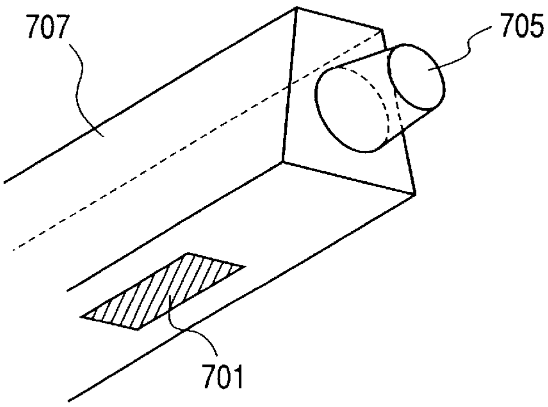

As shown in FIG. 8, two electrothermal converting elements, namely, two discharge energy generating elements, are arranged in the liquid flow path 107. These two electrothermal converting elements 101 are arranged with the different distances from the discharge port 105, respectively. Then, the size of the electrothermal converting element 101 on the discharge port 105 side is made smaller than that of the one on the liquid chamber side. Each of the electrothermal converting elements 101 is selectively driven to change the amount of recording droplet discharges. For example, if smaller liquid droplets should be discharged, only the electrothermal converting element on the discharge port 105 side is driven. If larger liquid droplets should be discharged, both of the electrothermal converting elements 101 are driven simultaneously. In this way, recording is possible in binarized gradation. Here, of course, the gradation recording method is not necessarily limited to the method described above.

With the arrangement that enables the discharges of the smaller and larger liquid droplets as described above, printing is made executable at still higher speeds.

In this respect, when the gradation recording is executed, it is desirable to make the difference in the discharge speeds smaller, while the difference is made larger in the amount of liquid droplets between the larger and smaller droplets.

In accordance with the present invention, it is possible to secure a comparatively large amount of larger droplet discharges even with a comparatively small diameter of the discharge port. At the same time, the speed of the smaller droplet discharges is not made lower as compared with the conventional head. Therefore, it becomes possible to make the difference in speeds smaller, while the difference made larger in the amount of larger and smaller droplet discharges.

In accordance with the present embodiment, the structure is arranged so that a plurality of electrothermal converting elements are arranged along the liquid flow path. However, if only the distances from the electrothermal converting elements to the discharge ports should differ from each other, it may be possible to arrange the structure so as to enable them to intersect in the liquid flow path direction. Also, the sizes of the electrothermal converting elements are not necessarily different from each other.

In this respect, the distance from the electrothermal converting element to the discharge port means the distance from the center of area of the electrothermal converting element to the end of the discharge port on the ink discharge side.

Now, in the embodiments described above, the sectional configuration of each liquid flow path that extends from the common liquid chamber is arranged to be equally-footed trapezoidal. However, such configuration is not necessarily limited to it. For example, for the ink jet recording head of the first embodiment, the shape of the opening of the tapered discharge port 105 on the liquid flow path 107 side may be circular, elliptical, or the like that is arranged to be in contact with the inner side of the equally-footed trapezoidal liquid flow path 107. It should be good enough if only the leading end portion of the liquid flow path is made gradually smaller while it is extended toward the discharge port, and also, the stagnation of ink is smaller in the leading end portion of the liquid flow path when ink is discharged. Also, for the first to third embodiments described above, Kr—F excimer laser is adopted as the laser light source, but it may be possible to use other pulse ultraviolet laser, such as Xe—Cl excimer laser. It may also be possible to use the fourth higher harmonic waves of YAG laser; the fundamental waves of the YAG laser; the second higher harmonic waves of YAG laser; the mixing waves of the fundamental and second higher harmonic waves of the YAG laser; the nitrogen gas laser beam, or the like.

Also, for the light shielding section of the mask and the extinction element of the attenuation sections, chromium layer is used. However, aluminum, phosphor bronze, nickel, or the like may be used.

Also, for the discharge energy generating element, an electrothermal converting element is used, but piezoelectric element (piezo element) or the like may be used.

As described above, the present invention makes it possible to produce effect on stabilizing the discharge speeds of recording droplets, particularly when printing is made at higher speeds by arranging to make the shape of the leading end portion gradually smaller for each of the liquid flow paths on the discharge port side, which is extended in one direction to be communicated with the common liquid chamber to the discharge port, so as to make the fluid resistance of recording liquid smaller for the stabilization of discharge speeds of recording droplets. Further, when smaller droplets should be discharged, the discharge speeds are enhanced, while maintaining the stability of the discharge speeds, thus suppressing the generation of mist of recording liquid that may be caused when smaller liquid droplets are discharged. As a result, the present invention is remarkably effective on recording images in high precision.

Also, in accordance with the present invention, when each of the liquid flow paths which is configured to be extended toward the discharge port, while its leading end portion being made gradually smaller, and the discharge port that is communicated with the liquid flow path are formed, the laser beam is irradiated for processing from the common liquid chamber side to the plate portion where each of the discharge ports is formed through the mask which is provided with the transmission section that transmits the laser beam to regulate the configuration of each discharge port as well as with the attenuation sections formed on the outer circumference of the transmission section, which make the transmissivity of the laser beam smaller gradually as each of them parts farther away from the transmission section. With such arrangement, it is made possible to produce effect on the formation of each of the discharge ports, the leading end portion of liquid flow path on the plate portion stably in good processing precision. Also, there is no need for the preparation of plural masks when processing the leading end portion in such shape as described above. Therefore, there is an effect that the discharge ports can be formed with ease at lower costs. As a result, it is made possible to provide an ink jet recording head capable of recording images in higher precision, while minimizing the costs of its manufacture.

What is claimed is:

1. A method for manufacturing an ink jet recording head provided with a plurality of discharge ports for discharging recording liquid, a discharge port plate having said discharge ports therein, a liquid chamber for retaining said recording liquid, a plurality of discharge energy generating elements for discharging said recording liquid, a substrate having said plurality of discharge energy generating elements on one surface thereof, and a plurality of liquid flow paths extended in one direction for communicating said liquid chamber with said discharge ports, said liquid flow paths each having a rectangular cross-section, and said discharge ports being formed by irradiating a laser beam on a member which thereby becomes said discharge port plate through a mask having specific patterns thereon, said mask including a transmission section which regulates a shape of said discharge ports, and an attenuation section formed on an outer circumference of said transmission section so that the further the attenuation section is from the transmission, the less the laser beam becomes, and forming the discharge ports by irradiating the laser beam through the mask to said member, each said port having a cross-sectional shape which gradually tapers from a rectangular shape at a side of the port connected with said liquid flow path to a circular shape at a recording liquid discharge side of the port.

2. A method for manufacturing an ink jet recording head according to claim 1, wherein the patterns on said mask are provided with a light shielding section formed on an outer circumference of said attenuation section to suppress an energy density of the laser beam to be equal to or less than a processing threshold value of the member becoming said discharge plate.

3. A method for manufacturing an ink jet recording head according to claim 1, wherein said attenuation section of said mask is arranged to reduce the transmission of the laser beam by 10% with increasing distance from said transmission section.

4. A method for manufacturing an ink jet recording head according to claim 1, wherein said attenuation sections are formed by scattering a plurality of extinction elements reflecting or absorbing the laser beam from the laser light source.

5. A method for manufacturing an ink jet recording head according to claim 4, wherein the size of said extinction elements is smaller than the quotient obtained by dividing a resolution of a projection optical system by a predetermined magnification of the projection optical system.

6. A method for manufacturing an ink jet recording head according to claim 4, wherein the size of said extinction elements is smaller than the quotient obtained by dividing a processing resolution determined by the processing condition of a laser processing apparatus used for the processing by a specific magnification of a projection optical system.

7. A method for manufacturing an ink jet recording head according to claim 4, wherein said extinction elements make an energy density of the laser beam transmitting said extinction elements equal to or lower than a processing threshold value of the member becoming said discharge plate.

8. A method for manufacturing an ink jet recording head according to claim 4, wherein said extinction elements shield the laser beam incident upon said extinction elements by 10%.

9. A method for manufacturing an ink jet recording head according to claim 1, wherein said laser beam is an excimer laser beam.

* * * * *